Patented July 3, 1934

1,964,960

UNITED STATES PATENT OFFICE 1,964,960

ADHESIVE COMPOSITION

Gordon G. Pierson, Lansdale, Pa., assignor to Perkins Glue Company, a corporation of Delaware No Drawing. Application February 19, 1930, Serial No. 429,820

6 Claims. (Cl. 87—17)

This invention relates to an adhesive composition containing casein and to a process for making and applying it.

The usual practice in making casein glues is to dissolve the casein in an alkali such as lime, borax or soda ash. It is known that formaldehyde tends to harden casein and to render it more water-resistant, but addition of formaldehyde to alkaline solutions such as mentioned above, results in rapid coagulation of the casein so that it has been impossible to employ such aldehyde mixture in practice. It has been proposed to dissolve casein in a solution of urea using several times as much urea as casein and some paraformaldehyde has been added to this mixture, but the results of this mixture are not satisfactory giving glues having a lower water-resistance and strength than the usual well-known casein lime glues.

It has also been attempted to harden the old alkaline casein glues by applying them to the making of the joint and then exposing this joint to formaldehyde, but the hardening effect of the formaldehyde has not been satisfactory under these circumstances due to the fact that formaldehyde seems to have difficulty in impregnating the entire glue film and tends to harden it only at the edges of the joint.

The principal object of the present invention is accordingly to provide a casein aldehyde glue which shall have the necessary strength for use in making joints such as in the wood-working industry and with an equal or greater waterproofness than the known alkaline casein glues. Another object of the invention is to provide a simple and efficient process for the manufacture of such composition and a simple and efficient process for applying the material to surfaces such as wood to make a strong highly waterproof joint.

The invention accordingly comprises the novel compositions and component mixtures comprised in such compositions, as well as the novel processes and steps of processes according to which such compositions may be manufactured and applied, specific embodiments of which are described hereinafter by way of example only and in accordance with what I now consider the preferred manner of practicing the invention.

I have found in accordance with this invention that a fluid adhesive capable of remaining fluid at ordinary room temperature for several hours, coagulable on heating and on coagulation providing highly waterproof joints of about the strength of the usual glues employed in wood-working, can be prepared by combining casein with not more than about twice its weight of neutral solvent such as ammonium sulpho cyanate solution with a limited quantity of water and an active aldehyde such as paraformaldehyde.

I give below preferred examples for the composition and of the process of making and applying it. These examples are given as illustrations and it is to be understood that I do not restrict myself thereto.

*Example 1.*—100 parts of casein are added to 200 parts of water. To this mixture is then added 10 to 40 parts of ammonia sulpho cyanate, to dissolve the casein. In order to aid solution, a small quantity of ammonia, preferably 3 parts is added. The solution is then heated at about 175° F. until solution occurs, which ordinarily will take place in 30 minutes. With large quantities of ammonium sulpho cyanate or the like, it is not necessary to heat the solution but with smaller quantities nearer the lower range, it is preferable to employ heat at the temperature mentioned. The solution is then cooled to room temperature and 10 to 25 parts of paraformaldehyde is added.

The glue so prepared is ready for use. It is a fluid adhesive capable of remaining fluid at ordinary room temperature for several hours, which permits a batch of it to be made up and to be used gradually over such period, to permit the continuous operation of the spreading machines. The glue, however, is coagulable by heat. I have found upon actual tests that the glue made up according to the above formula, containing 20 to 30% of ammonium sulpho cyanate and 20 to 25% of paraformaldehyde, can be coagulated at 150° F. in two or three minutes. At 125° F. coagulation occurs in 15 to 20 minutes. There is, therefore, a quite definite range of temperature within which this glue coagulates. It may be applied by the usual means employed for liquid adhesives. It is easily spreadable by all commonly used machinery or may be applied by a brush. It is found that the water resistance of the dry films is greatly increased by heat. And after application, the adhesive is either dried and then heated to effect coagulation or else it may be heated without previous drying. For example, in the application of this glue to veneering, after the glue has been spread and the veneer applied to the wooden surface to be covered by the veneer, the whole is placed in a press and heated, as in the usual manner employed with blood albumen glues. The heat employed should be sufficient to coagulate the glue. Instead of heating in this manner, if it is desired the glue may be employed in the manner usual to casein glues by which the glue is applied to the joint, and allowed to dry, and thereafter heated to effect coagulation. The joint formed by either method employing the adhesive composition, is strong, having a strength equal about to that of the usual glues now used in the wood-working industry. In addition the glue is highly waterproof.

Another example giving similar results is as follows:—

Example 2.—100 parts of casein is combined with 200 parts of water. To this mixture is added 15 to 45 parts of thio urea to dissolve the casein. From 1 to 3 parts of ammonia are preferably added to accelerate the solution which is then heated to 175° F., and upon cooling, 20 to 30 parts of formaldehyde are added.

Each of these examples, it will be noted, employs less than 50% of material based on the weight of the casein such as ammonium sulpho cyanate in making up the solvent for the casein. In the first example, 10 to 40% of ammonium sulpho cyanate is used and in the second example 15 to 45% of thio urea. I now prefer to employ up to 50% of the weight of the casein as this solid material. I find that the properties of the glue are at the optimum when using 50% or less of ammonium sulpho cyanate or similar material based on the weight of the casein taken, and under these circumstances I produce a strong tacky glue capable of producing satisfactory results when used as a substitute for the glues now used in the wood-working industry for joining wood. The glue is also waterproof having a high water-resistance. It does not thicken appreciably over a period of several hours when kept at room temperature but when heated coagulates almost spontaneously within a narrow and well defined temperature range, being similar in this action to the coagulation which occurs upon the heating of blood and egg albumen glues. I have found that if more than about 200% of this casein solvent such as ammonium sulpho cyanate is employed, I do not obtain a satisfactory glue for use in wood-working. It is not strong and tacky, does not have proper water-resistance and the glue loses its power of rapidly coagulating to a strong jell when applied as herein described.

Along with the preferred proportion of ammonium sulpho cyanate or similar material, I find it also important to employ about enough water to produce a concentrated solution of casein. In the examples, the water is employed in a proportion of 200% based on the weight of the casein taken. This amount may be varied somewhat, but I prefer to use not less than 150% and not over 400%.

Other materials than those mentioned in the examples but having similar properties thereto, may be employed for the manufacture of the adhesive. Instead of ammonium sulpho cyanate and thio urea, I may use triethanolamine. I have also obtained satisfactory results by the use of urea. Both of these substances of course should be used within the limits mentioned above to produce the desired characteristics in the resulting glue, such as being highly waterproof and forming a strong satisfactory joint for wood-work, equal substantially to that obtained by the usual present day glues in the wood-working industry. The proportions of paraformaldehyde mentioned in the preferred example #1 give highly satisfactory results, but I have obtained useful effects for various purposes by varying the content of paraformaldehyde from 2 to 40%. I prefer the aliphatic aldehydes such as formaldehyde, paraformaldehyde and acet-aldehyde and the like, and their compounds such as formaldehyde sodium sulphite and formaldehyde analine, glyoxal acet aldehyde and aldol. Other aldehydes and their compounds may be also used. It is noted in the examples that I prefer to employ small quantities of ammonia to aid in the solution of the casein. Most casein on the market has an acid reaction. The more acid the casein, the more difficult it is to dissolve and it is for this reason that the small quantity of ammonia is employed. Instead of ammonia, I may employ in small quantities other alkalies such as borax and soda ash. For the best results only enough of the alkaline materials to bring the mixture to a nearly neutral condition, should be added.

While the invention has been described in detail with respect to certain preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:—

1. A glue containing casein about 1 part, water about 1.5 to 4 parts, 2 parts or less of a substance which with the water is a neutral solvent for the casein, and a small proportion of an active aldehyde.

2. A glue containing casein about 1 part, water about 1.5 to 4 parts, 2 parts or less of a substance which with the water is a neutral solvent for the casein selected from a group consisting of urea, a compound thereof, and a derivative of urea, together with a small proportion of an active aldehyde.

3. A glue according to claim 1 in which the active aldehyde is paraformaldehyde.

4. A fluid adhesive capable of remaining fluid at ordinary room temperature for several hours, coagulable on heating and on coagulation providing a joint having about the strength of the usual glue employed in wood-working, comprising one part of casein, not more than about 2 parts of ammonium sulpho cyanate dissolved in water, and paraformaldehyde in the proportion of 2 to 40% based on the weight of the casein.

5. A glue base capable of forming upon addition of water, a fluid adhesive capable of remaining fluid at ordinary room temperature for several hours, coagulable on heating and on coagulation providing a joint having about the strength of the usual glue employed in wood-working, comprising casein about 1 part, less than about 2 parts of a substance which with the water forms a neutral solvent for the casein, and a small part of an active aldehyde.

6. An adhesive base capable upon addition of water and an active aldehyde of producing a fluid adhesive capable of remaining fluid at ordinary room temperature for several hours, coagulable on heating and on coagulation providing a joint having about the strength of the usual glue employed in wood-working, comprising casein about 1 part, less than 2 parts of a substance selected from the group ammonium sulpho cyanate, urea and triethanolamine.

GORDON G. PIERSON.